(12) United States Patent
Ogawa (10) Patent No.: US 7,697,749 B2
(45) Date of Patent: Apr. 13, 2010

(54) STEREO IMAGE PROCESSING DEVICE (75) Inventor: Gemya Ogawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 955 days.

(21) Appl. No.: 11/198,035

(22) Filed: Aug. 5, 2005

(65) Prior Publication Data

US 2006/0029272 A1 Feb. 9, 2006

(30) Foreign Application Priority Data

Aug. 9, 2004 (JP) .............................. 2004-232394
Sep. 24, 2004 (JP) .............................. 2004-277978

(51) Int. Cl.
*G06K 9/00* (2006.01)
(52) U.S. Cl. ..................... 382/154; 382/103; 250/208.1
(58) Field of Classification Search ................ 382/103, 382/154

See application file for complete search history.

(56) References Cited

U.S. PATENT DOCUMENTS

| 5,768,404 | A * | 6/1998 | Morimura et al. ............ 382/107 |
| 6,215,899 | B1 * | 4/2001 | Morimura et al. ............ 382/154 |
| 6,519,358 | B1 * | 2/2003 | Yokoyama et al. ........... 382/154 |
| 2001/0045979 | A1 * | 11/2001 | Matsumoto et al. ............ 348/43 |
| 2002/0085747 | A1 * | 7/2002 | Yoshigahara et al. ......... 382/154 |
| 2005/0008220 | A1 * | 1/2005 | Miyazaki ..................... 382/154 |

FOREIGN PATENT DOCUMENTS

| JP | 05-114099 | 5/1993 |
| JP | 08-279045 | 10/1996 |
| JP | 11-248446 | 9/1999 |
| JP | 2001-160144 | 6/2001 |
| JP | 2001-194126 | 7/2001 |

* cited by examiner

*Primary Examiner*—Bhavesh M Mehta
*Assistant Examiner*—Michael Vanchy, Jr.
(74) *Attorney, Agent, or Firm*—Haynes and Boone, LLP (57) ABSTRACT

A stereo image processing apparatus is provided. The apparatus comprises an imaging device for taking a pair of images of an object for stereo image processing purpose; a stereo processor for correlating the pair of images for each small area thereof to thereby perform stereo matching processing for identifying corresponding areas, and obtaining an evaluation function as a result of said stereo matching processing, distance information to said object obtained based on said evaluation function, and reliability information indicating a reliability of said distance information; a parallax corrector for setting an adaptive search range around a small area in question according to said reliability information, obtaining a corrected evaluation function by correcting said evaluation function obtained for said small area in question based on said evaluation function obtained for a respective small area within said adaptive search range, and correcting said distance information based on said corrected evaluation function obtained.

11 Claims, 9 Drawing Sheets

STEREO IMAGE PROCESSING DEVICE

CROSS REFERENCE TO RELATED APPLICATIONS

This application claims priority under 35 U.S.C. 119 based upon Japanese Patent Application Serial No. 2004-232394, filed on Aug. 9, 2004, and Japanese Patent Application Serial No. 2004-277978, filed on Sep. 24, 2004. The entire disclosure of the aforesaid application is incorporated herein by reference.

FIELD OF THE INVENTION

The present invention is related to a stereo image processing apparatus, and more specifically related to a stereo image processing apparatus which is capable of appropriately and effectively performing a correction for a small area where an incorrect stereo matching processing caused a mismatch.

BACKGROUND OF THE INVENTION

An image processing by so-called stereo method is generally known as a 3-dimensional measurement technology using imaging. This method employs 2 cameras (stereo cameras) to take a pair of images of an object from different positions, correlate the pair of images to thereby obtain information on a distance to the object with the triangulation principle using camera parameters such as stereo camera positions, a focal length, and the like from a parallax for the same object.

In image processing employing the above stereo method, a disparity between the 2 images is detected by determining a position where 2 sets of image signals from the stereo cameras match while sequentially shifting the 2 sets of image signals to thereby calculate a distance to the object. In general, the above position where 2 sets of image signals match is obtained by comparing brightness of the image signals from the 2 cameras.

This image comparison is performed for each small area with a predetermined pixel count due to a computation speed and the like. For a base image and a reference image, for example, a city block distance is calculated to correlate each other for each small area (also called a "matching block") of each image to thereby perform stereo matching processing for identifying corresponding areas to obtain 3-dimensional image information (a distance image), which is a numeric expression of information on a distance to the object obtained from a pixel disparity (=parallax) according to a distance to the object.

In the stereo matching processing for the 2 images, however, a mismatch problem may occur where the correspondence is incorrect.

To address this mismatch problem, JP-A-2001-160144 discloses an apparatus comprising a mechanism for determining the existence of the mismatch from a result obtained in the image matching processing.

Also JP-A-H11-248446 discloses a technique for voting on the parallax for the matching block in question and its surrounding 8 blocks to reduce the mismatch.

Further, JP-A-H8-279045 discloses a technique for specifying a priority for a tentative corresponding point candidate against other corresponding points, and obtaining the parallax consistent with the correspondence.

However, the above JP-A-2001-160144 technique simply determines the presence of the mismatch and a mechanism for reducing a mismatch influence to improve the stereo matching accuracy is not disclosed.

Moreover, the proposal in the JP-A-H11-248446 does not offer sufficient effect when actual space has 3-dimensional depth equivalent to a resolution of the matching block, or for areas such as a wall surface without sufficient image features for the matching processing.

Likewise, the proposal in the JP-A-H8-279045 does not provide enough correction effect for areas such as a wall surface.

SUMMARY OF THE INVENTION

Considering the above problems, the purpose of the present invention is to provide a stereo image processing apparatus capable of a high accuracy parallax detection by reducing mismatches during image matching.

According to a principal aspect of the present invention, there is provided a stereo image processing apparatus, comprising an imaging device of an object; a stereo processor for correlating a pair of images for each small area thereof, the pair of images taken by the imaging device to thereby perform stereo matching processing for identifying corresponding areas, and obtaining an evaluation function, the evaluation function being a result of the stereo matching processing, distance information, the distance being to the object, the distance information obtained based on the evaluation function, and reliability information indicating a reliability of the distance information; a parallax corrector for setting an adaptive search range around a small area in question according to the reliability, obtaining a corrected evaluation function by correcting the evaluation function obtained for the small area in question based on the evaluation function obtained for a respective small area within the adaptive search range, and correcting the distance information based on the corrected evaluation function obtained.

According to one embodiment of the present invention, the parallax corrector regards the corrected evaluation function as a summation of all of the evaluation functions, each obtained for the respective small area. Also the parallax corrector preferably weighs the evaluation function obtained for the respective small area within the adaptive search range according to the reliability information obtained for the respective small area and a distance between the respective small area and the small area in question, and then takes a summation of all of the evaluation functions as the corrected evaluation function.

According to another embodiment of the present invention, the parallax corrector is provided with a storage for storing the evaluation functions, the distance information, and the reliability information obtained by the stereo processor for all of the small areas, and obtains the corrected evaluation function based on the evaluation functions, the distance information, and the reliability information read from the storage.

According to yet another embodiment of the present invention, the parallax corrector sets the adaptive search range based on the reliability information obtained by the stereo processor, wherein the stereo processor obtains the evaluation functions, the distance information, and the reliability information for the respective small areas set within the adaptive search range, wherein the parallax corrector calculates the corrected evaluation function based on the evaluation functions each for the respective small area within the adaptive search range, the evaluation functions obtained by the stereo processor.

According to still another embodiment of the present invention, the stereo processor comprises a determinant factor extractor for extracting one or more feature quantities from a plurality of images to which matching processing is performed, wherein the parallax corrector is provided with a determination section for evaluating a reliability of the matching processing based on the feature quantities extracted, and a correction section for correcting a mismatch which occurs during the matching processing based on evaluation information from the determination section. In this case, the determination section is preferably configured using a neural net for evaluating the reliability of the matching processing for a plurality of images by the stereo processor. Additionally, the feature quantities preferably includes at least one of: an analysis result of the evaluation function used for the matching processing, a factor indicating uniqueness of a pixel area, or a factor indicating relevance with surrounding pixel areas.

According to yet another embodiment, the analysis result of the evaluation function used for the matching processing includes at least one of: a value of the evaluation function or a factor indicating a shape of the evaluation function.

According to still another one embodiment, the factor indicating the shape of the evaluation function includes at least one of: the number of local minimum points, a width of a valley containing a minimum point or an acute angle of the valley containing the minimum point.

According to yet another embodiment, the factor indicating the uniqueness of a pixel area includes at least one of: the number of pixels in a pixel area, in the pixels an absolute value of a difference in a direction along an epipolar line exceeds a predetermined value, a mean absolute difference in a direction along an epipolar line, or a variance of brightness values in a pixel area.

According to still another embodiment, the factor indicating the relevance with surrounding pixel areas includes at least one of: the number of pixel areas in which a value of the evaluation function in self-matching processing is less than a predetermined value, the number of local minimum points, a width of a valley containing a minimum point, an acute angle of the valley containing the minimum point, or the number of pixel areas which output an identical parallax in the vicinity of one pixel area arbitrarily selected.

According to the present invention, the parallax correction enables a reduction of the mismatch influence, and particularly, an improvement in the stereo matching accuracy in a low texture area such as a wall surface, with which conventional techniques had difficulties. Especially, a correction capable of retaining area features may be effected to enable a high accuracy correction.

Noted that these and other characteristics and effects of the present invention will be easily appreciated by those skilled in the art upon referring to the following preferred embodiments when taken in conjunction with the accompanying drawings.

DETAILED DESCRIPTION OF THE PREFERRED EMBODIMENTS

Stereo Image Processing Apparatus

Figure 1:
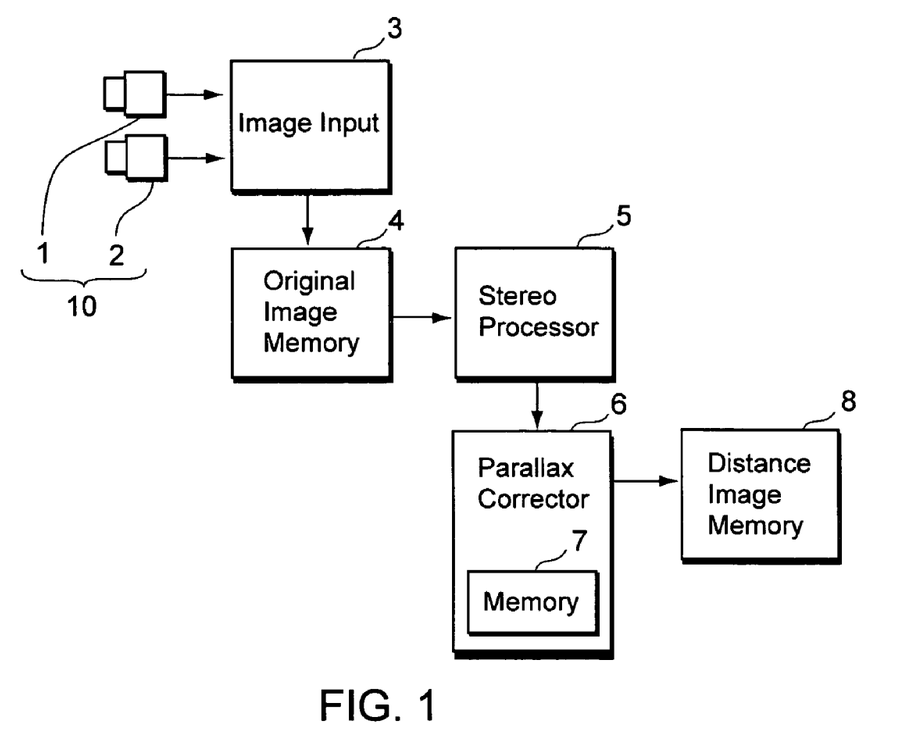
FIG. 1 is a block diagram showing a stereo image processing apparatus according to a first embodiment of the present invention.

Embodiments of the present invention will be described in detail below in accordance with accompanying drawings. FIG. 1 is a block diagram showing a stereo image processing apparatus according to a first embodiment of the present invention.

Defined by a right camera 1 and a left camera 2, stereo cameras 10 are provided at a camera installation position (not shown) with the right and left cameras 1 and 2 comprising a predetermined baseline length. The cameras 1 and 2 comprises the same focal length and directions of their lines of sight may be configured vertically to the baseline. For example, the right camera 1 is configured to take images of a base image during stereo processing, and the other left camera 2 is configured to take images of a reference image during the stereo processing.

Note that the right and left cameras 1 and 2 should only be provided with the predetermined baseline length, and may be positioned horizontally so that the baseline is along the horizontal direction, or may be positioned vertically so that the baseline is along the vertical direction, or otherwise may be positioned with an angle so that the baseline is slanted. In this embodiment, the cameras 1 and 2 are assumed to be provided horizontally with their baseline along the horizontal direction for brevity.

The cameras 1 and 2 take images of an object and output image signals for images taken. The image signals from the cameras 1 and 2 are given to an image input 3.

This image input 3 is provided with, among others, an analog interface comprising a gain control amplifier (not shown), an A/D converter for converting analog image data to digital image data, and a log conversion table for a logarithmic conversion for bright and dark sections of the images. The image input 3 adjusts the gain of image signals from the cameras 1 and 2 for a signal balance, and then converts the signals into digital signals. In addition, the image input 3 performs image corrections such as improving a contrast in low brightness sections with a log conversion, converts the image signals into digital signals with a predetermined brightness scale, and stores them in a original image memory 4.

Digital image signals stored in the original image memory 4 are supplied to a stereo processor 5. This stereo processor 5 performs stereo matching processing, in which it calculates, for example, a SAD (Sum of Absolute Difference) value (city block distance) of a brightness value for each of predetermined small areas of the base and reference images (for example, a 4×4 pixel area, hereafter referred to as a "block"), and correlates the base and reference images to thereby identify corresponding areas. A distance between corresponding small areas occur depending on a distance to the object and this distance (pixel disparity) is equivalent to a parallax. The stereo processor 5 is configured to be capable of generating and outputting 3-dimensional image information (a distance image), which is a numeric expression of information on a distance to the object obtained from this disparity quantity.

Since the cameras 1 and 2 are positioned so that the baseline is horizontal, and are configured to take images along a direction vertical to the baseline, the stereo processor 5 is capable of obtaining distance information by a matching processing which moves the blocks onto a horizontal epipolar line. A matching evaluation function indicative of a degree of correlation may employ the SAD or otherwise a sum of squared brightness differences for each pixel between the base and reference images. In this case, the closer the sum of squared brightness differences is to zero, the higher the correlation is. Note that the evaluation criteria for the degree of correlation is not limited to the sum of squared brightness differences and, for example, a normalized cross-correlation value of the brightness value or the like may be employed as well.

In the stereo matching processing, for a small area in the base image (hereafter also referred to as a "matching block"), a small area at a corresponding position in the reference image is shifted on the epipolar line by one pixel at a time within a predetermined search range to thereby calculate a SAD value for the matching block in the base image and for each small area in the reference image (hereafter referred to as a "reference block"), respectively. Then the disparity (parallax) between a reference block and a matching block which give the smallest SAD value is obtained as the distance information.

Further, the stereo processor 5 is configured to also obtain a parallax value of the matching block as well as a reliability of the parallax value. Specifically, a difference Hx between a minimum SAD value Hm obtained for each matching block and a maximum SAD value HM is obtained, and reliability of the distance information is determined according to whether or not the following 3 conditions are satisfied:

(1) Hm is a predetermined value or less.
(2) Hx is a predetermined value or less.
(3) There are a predetermined or greater number of pixels whose edge is determined to be valid.

If all of (1), (2) and (3) are satisfied, the reliability is determined to be "positive". If two of these three conditions are met, the reliability is "moderately positive". In all other cases, the reliability is "negative."

The above (1) and (2) are conditions for determining whether or not an obtained minimum value Hm is due to a noise, and by using the maximum value HM, it is possible to detect a distance for an object with a gradual brightness change such as a curved surface.

In the condition (3), an edge can be detected if a relatively large threshold is set for an edge validation, and with a lower threshold, a gradual brightness change may be detected. This condition is employed based on a basic principle that a distance may not be detected where there is no brightness change. Since the edge validation is performed for every pixel in each small area, only the pixels with a detected distance are utilized in the small area, providing a reasonable result by using the condition (3).

The stereo processor 5 may provide the reliability using values obtained from uniqueness of the matching block, parallax value relationships with the surrounding matching blocks and the like.

This stereo processor 5 may also express the reliability with 2 values, "positive" and "negative", or 3 values additionally including "moderately positive." It should be mentioned that processing for generating the distance information from images taken by stereo cameras is disclosed in detail in JP-A-H5-114099 by the present applicant.

As for reliability determination, a method disclosed in the Japanese patent application No. 2004-232394 by the present applicant is more preferable to a determination method described above. This preferable method, described more in detail in the latter half of the present embodiment, is summarized as that the above determination is performed with a plurality of feature quantities which are: evaluation function values (the maximum, minimum and mean SAD values), a shape of the evaluation function (the number of local minimum points, a width of a valley containing a minimum point and an acute angle of the valley containing the minimum point of the evaluation function), the uniqueness of the matching block, and relevance with surrounding pixel areas.

In this method, the number of the local minimum points means the number of points where: a SAD value $Si$ is equal to or less than a predetermined threshold (e.g., mean SAD); and its proximal N points (fixed value with N>2) satisfy $Si-N>Si-(N-1) \ldots >Si$, and $Si+N>Si+N-1 \ldots >Si$; in other words, the number of valleys. The width of the valley containing the minimum point is calculated by: first obtaining a minimum "n" which satisfies $k \times Si-n>Si-n-1$ in the leftward vicinity of the local minimum point, and a minimum "m" which satisfies $k \times Si+m>Si+m+1$ in the rightward vicinity of the local minimum point; and then calculating $n+m$. Here, the above "k" is a constant and usually set to 1. Further, the acute angle of the valley containing the minimum point is calculated in 2 methods: one in which a difference between a mean SAD value of the both ends of the width of the valley containing the minimum point, and the SAD value at the minimum point is divided by the width of the valley; and the other in which a mean SAD value difference is calculated for the two pixels adjacent to the minimum point and the minimum SAD value, respectively; that is $(Si+1+Si-1-2 \times Si)/2$.

A factor indicating the uniqueness of the matching block may be the number of pixels with a predetermined or greater absolute difference value in a direction along the epipolar line in the matching block, a mean absolute difference in the direction along the epipolar line in the matching block or a variance of brightness values in the matching block.

Moreover, a factor indicating the relevance with the surrounding matching blocks may be the number of blocks similar to a self-block in a self-matching processing, a mean value of a SAD function in the self-matching processing, values concerning a shape of the SAD function in the self-matching processing or the number of blocks which output the same parallax as from the self-block.

In the present embodiment, the stereo processor 5 outputs the distance information (parallax information) for each matching block, reliability of the distance information (reliability information), and a value of the matching evaluation function (SAD value) for all search ranges at the time of the matching processing to the parallax corrector 6.

Figure 2:
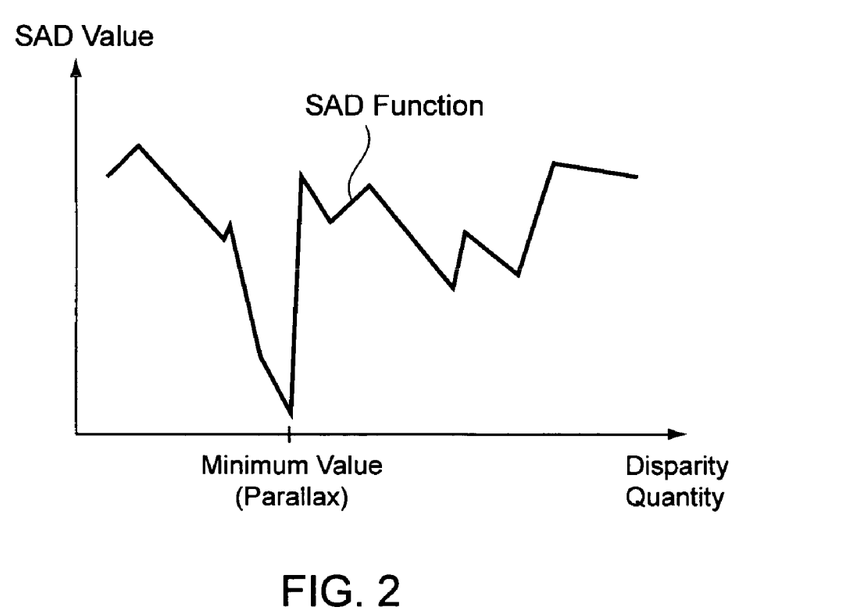
FIG. 2 is a graph showing one example of a SAD function, which is a matching evaluation function for a predetermined matching block, wherein the graph's horizontal axis is a disparity quantity between the predetermined matching block and a reference block, and the vertical axis is a SAD value.

FIG. 2 is a graph showing one example of a SAD function, which is a matching evaluation function for a predetermined matching block, wherein the graph's horizontal axis is a disparity quantity between the predetermined matching block and a reference block, and the vertical axis is a SAD value. The stereo processor 5 outputs a disparity quantity corresponding to a minimum SAD function value as the distance information (parallax information). This stereo processor 5 also outputs each SAD value within the search range. The parallax corrector 6 has a memory 7 capable of storing therein the minimum SAD value within the search range, i.e., the distance information, its reliability and all SAD values within the search range for each matching block.

Incidentally, the predetermined matching block and its surrounding blocks have relatively similar distance information and therefore similar SAD functions. For example, when the reliability of the distance information for the matching block is low, more accurate distance information may be obtained by utilizing the SAD function from the adjacent blocks with high reliability.

For this reason, in the present embodiment, the parallax corrector 6 is configured to obtain SAD values for a plurality of blocks in a predetermined range including the matching block (hereafter referred to as an "adaptive search range block") for each matching block, and obtain a corrected SAD function based on the obtained SAD value. For example, the parallax corrector 6 is capable of obtaining the corrected SAD function with a summation of the SAD functions of all adaptive search range blocks. Further, this parallax corrector 6 may obtain the corrected SAD function by weighting the SAD functions of the adaptive search range block according to the distance from the matching block in question and the reliability, and performing addition for each disparity quantity. In this case, the corrected SAD function S' obtained by the parallax corrector 6 takes:

Si,j (X) as the SAD function at a position (i, j) in the adaptive search range block based on the matching block in question, S'i,j (X) as the corrected SAD function at a position (i, j) in the adaptive search range block based on the matching block in question, Wp as a weighting factor based on the reliability, Wd as a weighting factor based on a distance between the matching block in question and the adaptive search range block; hence this corrected SAD function S' is given in Equation (1) below:

$$S'_{i,j}(X) = \sum_{ab} W_d \cdot W_p \cdot S_{a,b}(X) \tag{1}$$

In this equation, the greater the distance from the matching block in question to the adaptive search range block is, the lower the weighting becomes that the parallax corrector 6 applies to the SAD function obtained for the adaptive search range. Also the parallax corrector 6 applies lower weighting to the SAD function for the adaptive search range block with lower distance information reliability.

Further, the parallax corrector 6 outputs a disparity quantity which gives a minimum value of the corrected SAD function as the distance information. This distance information is given to a distance image memory 8. This distance image memory 8 is configured to maintain the distance information from the parallax corrector. The distance information of each block is converted from each block's brightness and a distance image is obtained by a display based on each block's distance information. Also image recognition software, among others, may perform distance measurement, obstacle recognition and the like by performing a calculation using the distance information stored in the distance image memory 8.

Figure 3:
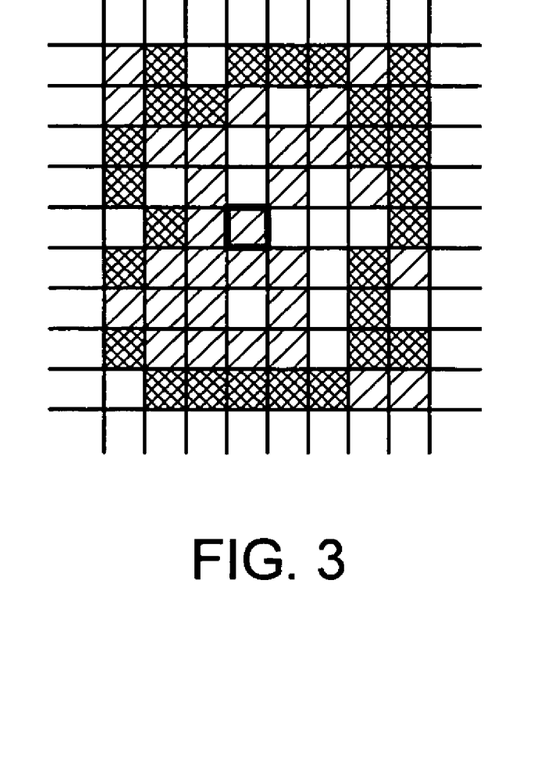
FIG. 3 is an explanatory view showing one example of reliability of distance information obtained for the predetermined matching block in question and its surrounding blocks.
Figure 4:
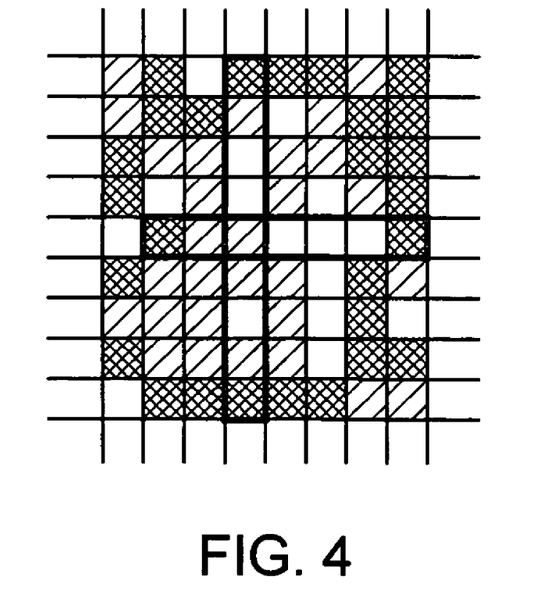
FIG. 4 is an explanatory view describing a method for determining an adaptive search range block.
Figure 5:
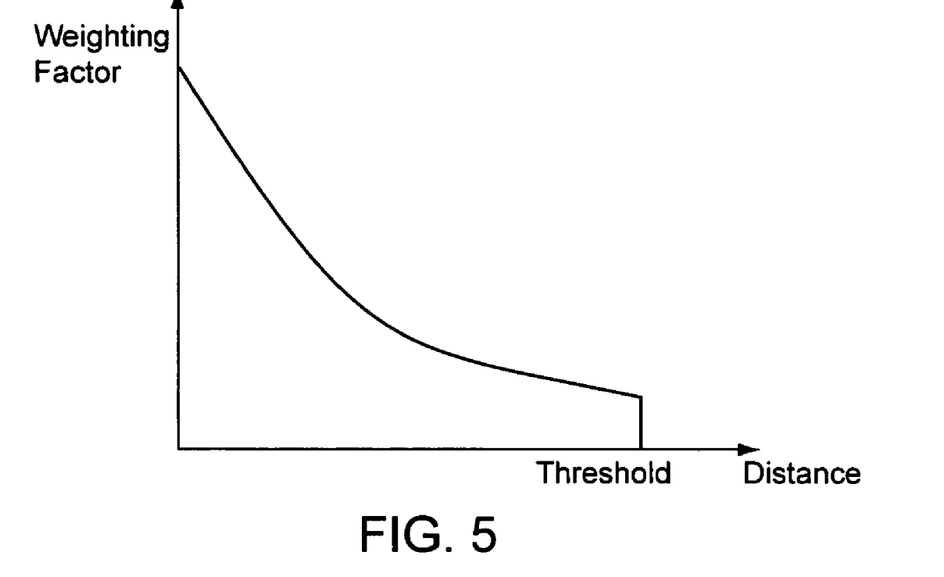
FIG. 5 is a graph showing an weighting factor Wd based on a distance between the matching block in question and the respective adaptive search range block, wherein the graph's horizontal axis is a distance from the matching block in question, and the vertical axis is the weighting factor.
Figure 6:
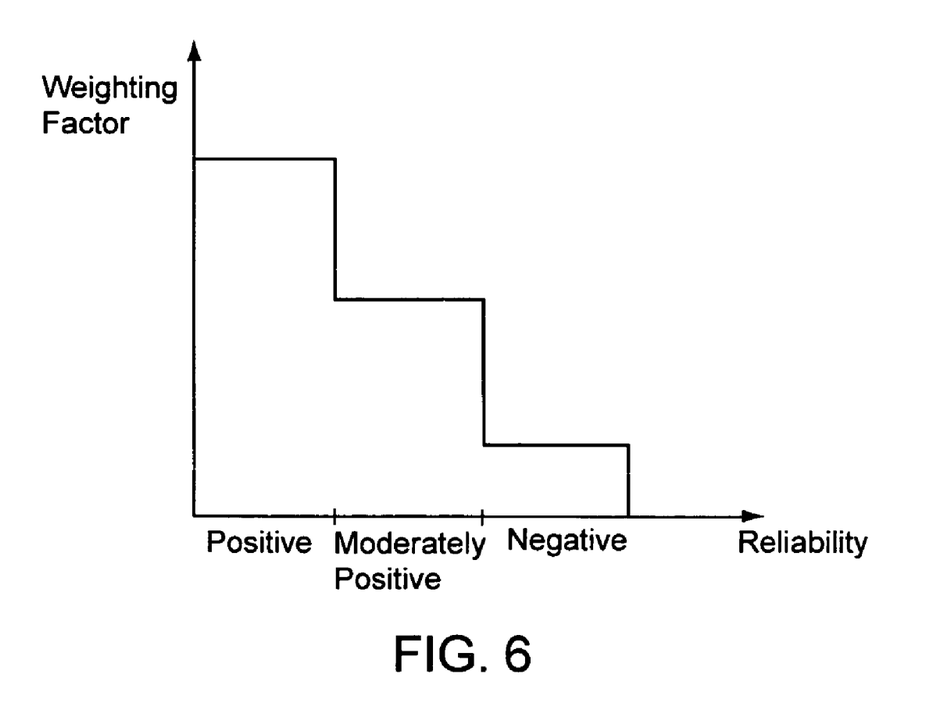
FIG. 6 is a graph showing an weighting factor Wp based on the reliability of the distance information, wherein the graph's horizontal axis is the reliability obtained for the adaptive search range block, and the vertical axis is the weighting factor for the SAD function of the adaptive search block.

Operations of the embodiment structured as above will be described below in accordance with FIGS. 3-7. FIG. 3 is an explanatory view showing one example of the reliability of the distance information obtained for the predetermined matching block in question and its surrounding blocks. Also FIG. 4 is an explanatory view describing a method for determining the adaptive search range block. FIG. 5 is a graph showing the weighting factor Wd based on a distance between the matching block in question and the respective adaptive search range block, wherein the graph's horizontal axis is a distance from the matching block in question, and the vertical axis is the weighting factor. FIG. 6 is a graph showing the weighting factor Wp based on the reliability of the distance information, wherein the graph's horizontal axis is the reliability obtained for the adaptive search range block, and the vertical axis is the weighting factor for the SAD function of the adaptive search range block. Further, FIG. 7 is a flowchart showing parallax correction processing by the parallax corrector 6.

Analog image signals entered from the right and left cameras 1 and 2 are proportionally amplified respectively in the image input 3. The amplified image signals are A/D converted to, for example, 256 scale digital signals, respectively. The digitized base and reference images are processed with a predetermined image correction and subsequently accumulated in the original image memory 4.

The stereo processor 5 sets the reference block within the reference image for the predetermined matching block within the base image, and obtains the SAD function for the brightness of the matching block in question and the reference block. The stereo processor 5 calculates the minimum SAD function value as the distance information as well as its reliability information. The stereo processor 5 then outputs to the parallax corrector 6, the distance information, its reliability information and the SAD values for all search ranges at the time of the matching processing for each matching block.

Figure 7:
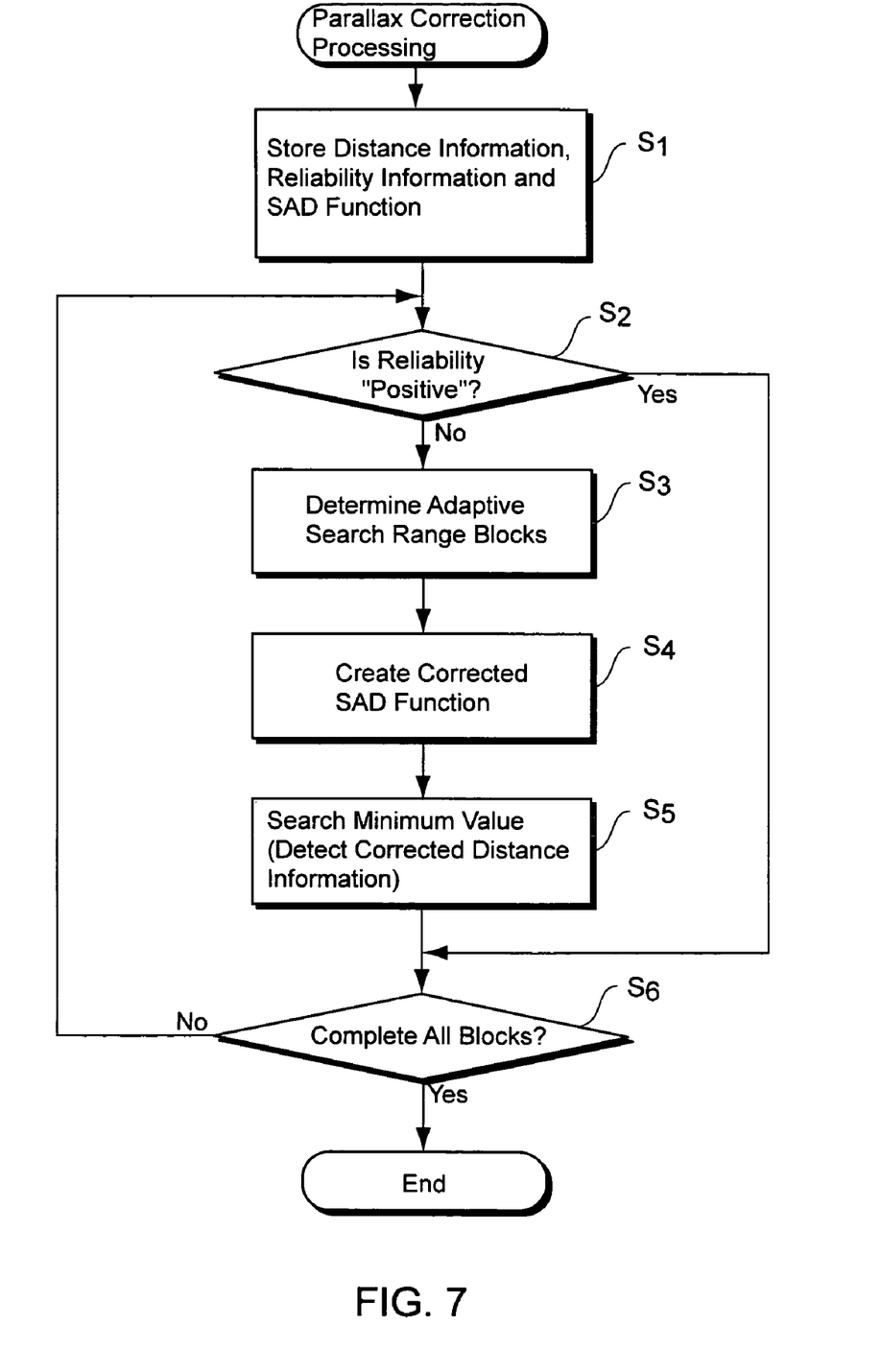
FIG. 7 is a flowchart showing parallax correction processing by a parallax corrector 6.

In Step S1 of FIG. 7, the parallax corrector 6 stores the distance information, its reliability information and the SAD values for all search ranges at the time of the matching processing for each matching block. The parallax corrector 6 corrects the distance information (parallax) based on a matching processing result. For example, it processes the parallax correction following the completion of matching processing for all blocks.

FIG. 3 shows blocks for the matching processing using frames. In this figure, lattice pattern sections indicate blocks where the distance information reliability from the matching processing result is "positive," while slant line pattern sections and solid sections indicate "moderately positive" and "negative" blocks, respectively. The parallax corrector 6 corrects the matching processing result for each block. In this case, the parallax corrector 6 applies the correction only to blocks with non-positive reliabilities; that is, blocks in which a mismatch (possibly) occurred during the matching processing. In Step S2, the parallax corrector 6 determines whether or not the reliability of a block in question is "positive."

Here the matching processing result in the stereo processor 5 is assumed to be as shown in FIG. 3, and the parallax corrector 6 corrects the distance information for a block surrounded by a bold frame shown in FIG. 3. Since this bold framed block's reliability is "moderately positive," processing moves from Step S2 to Step S3 to set the adaptive search range blocks. The parallax corrector 6 extends a block range for the parallax correction horizontally and vertically from the block in question as a base until, for example, it finds a block with the "positive" reliability.

FIG. 4 shows the adaptive search range blocks of the FIG. 3 example with bold frames. The adaptive search range blocks are a plurality of blocks in a cross-shaped range with the block in question as a center, and in the example of FIG. 4, contains 2 blocks horizontally on the left of, 4 blocks horizontally on the right of, 4 blocks vertically above, and 4 blocks vertically below the block in question, which are in total 15 blocks.

Note that a predetermined threshold may also be set for the adaptive search range. That is, blocks farther away from the block in question than a predetermined threshold are not included in the adaptive search range blocks. In addition, the parallax corrector 6 does not set the adaptive search range in the direction in which there is no blocks with the "positive" reliability within the threshold. For example, if there are no "positive" blocks within the threshold in one of the four directions, the adaptive search range becomes T-shaped.

It is to be also understood that there are various possible methods for determining the adaptive search range blocks. For example, blocks in a rectangular shaped range containing the block in question may be specified as the adaptive search range blocks. Additionally a preset adaptive search range may be employed with no regard to the reliability.

Next, the parallax corrector 6 obtains the corrected SAD function based on the above Equation (1) in Step S4. In this case, the parallax corrector 6 sums up each obtained SAD function with the weighting according to the reliability and the distance from the block in question for the bold framed adaptive search range blocks in FIG. 4.

FIG. 5 shows a relationship between the distance from the block in question and the weighting. As shown in FIG. 5, the smaller the distance is to the block in question, the greater the weighting becomes. FIG. 6 shows a relationship between the reliability and the weighting. As shown in FIG. 6, the higher the reliability is, the greater the weighting becomes. It is to be understood that the weighting of FIGS. 5 and 6 is only an example and various other characteristics are possible.

In the example of FIG. 4, of 4 "positive" blocks within the adaptive search range, the one which is two blocks to the left of the block in question is the closest to the block in question and therefore its weighting for the SAD function is the greatest. Further in the FIG. 4 example, for instance, in the four adjacent blocks to the block in question, the two "moderately positive" blocks have greater reliability than the other two "negative" blocks.

Thus the parallax corrector 6 applies the weighting to the SAD function of the adaptive search range blocks according to the distance and reliability and performs the addition for each disparity quantity to obtain the corrected SAD function. Since the corrected SAD function for the "moderately positive" or "negative" reliability is an average SAD function for the surrounding blocks, and since SAD function information of the "positive" reliability is utilized, the distance information reliability of the corrected SAD function is highly likely to be improved compared to that of a pre-correction SAD function.

In Step S5, the parallax corrector 6 obtains a disparity quantity which provides a minimum corrected SAD function value as corrected distance information. After this, this parallax corrector 6 repeats processing of Steps S2-S5 until it determines in Step 6 that the parallax correction is completed for all blocks to stop the processing. The parallax corrector 6 outputs the corrected distance information to the distance image memory 8.

In this manner, for blocks determined to have a low reliability of a stereo matching processing result, the present embodiment sets a predetermined adaptive search range including those blocks, and corrects the distance information with the summation of a stereo matching evaluation function for blocks within the adaptive search range. Thus, an accuracy of the corrected distance information may be improved. In addition, since the adaptive search range is configured to include high reliability blocks, the reliability of the corrected distance information is high as well. Moreover, since the stereo matching evaluation function is weighted according to the distance to the block in question and the reliability and subsequently summed up, the accuracy of the corrected distance information may be further improved.

More Preferred Method for Determining Reliability

Next, a more preferred method and its structure for determining the reliability in an image processing apparatus according to the present invention will be described below in accordance with FIGS. 8-15.

Figure 8:
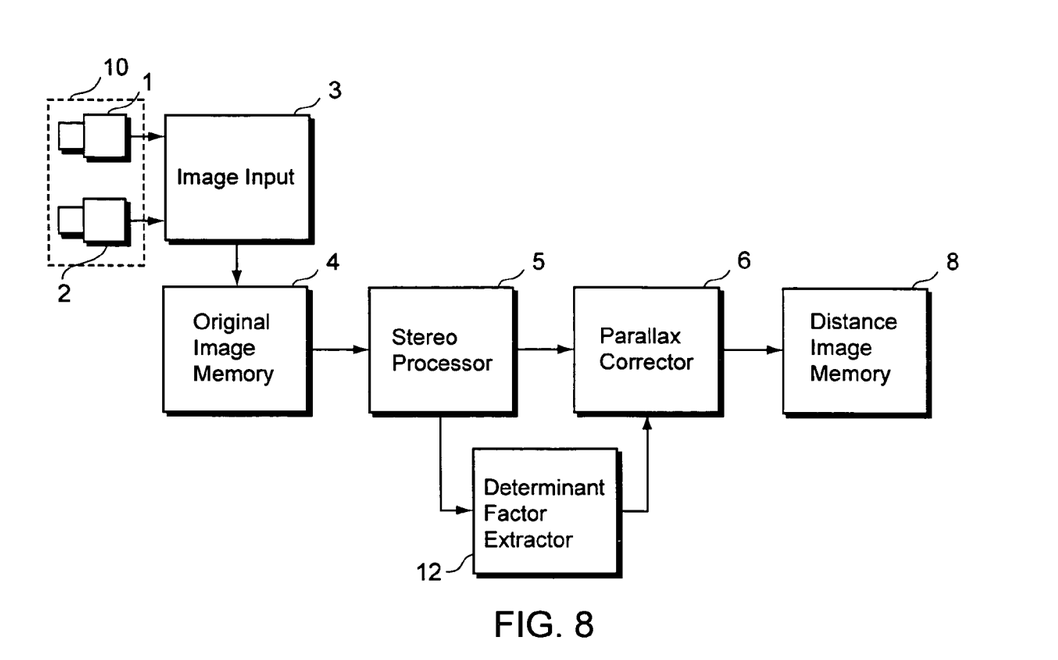
FIG. 8 is a block diagram showing a structure of the image processing apparatus according to the present invention.

As shown in FIG. 8, an image processing apparatus for implementing this method is defined by a stereo processor 5 and a determinant factor extractor 12 attached thereto.

To easily appreciate this reliability determination method, the components which are already described above will be re-described: The stereo cameras 10 are provided with and defined by two cameras 1 and 2, which may be synchronized with each other, whose shutter speeds are variable and each of which has a build-in image sensor such as a CCD (Charge Coupled Device) sensor, a CMOS (Complementary Metal Oxide Semiconductor) sensor and the like. One of these cameras (hereafter referred to as a "base camera 1") and the other camera (hereafter referred to as a "comparison camera 2") take base images Gb and comparison images Gc for the stereo processing, respectively and each camera are arranged so that their image-taking planes' vertical axes are parallel to each other with a predetermined baseline length.

An image input 3 is provided with and defined by an analog interface (not shown) comprising a gain control amplifier for responding to analog image signals sent from the stereo cameras 10, a log conversion table (not shown) for a logarithmic conversion for bright and dark sections of the images, an A/D converter (not shown) for converting analog image data to digital image data, and a correction circuit (not shown) for correcting the brightness and geometrically converting the images. In such a image input 3, each image signal sent from the stereo cameras 10 are processed so that a brightness balance of the analog image signals are adjusted by the gain control amplifier at the analog interface, then processed with an image correction such as a contrast improvement in low brightness sections with a log conversion, further converted by the A/D converter into digital signal data with a predetermined brightness scale, for example, 256 gray scale digital signals, and finally processed so that a disparity between the base image Gb and the comparison image Gc attributed to stereo camera positions is corrected by a geometrical conversion, such as an image rotation or translation by the correction circuit, so-called affine transformation.

An original image memory 4 consists of a semiconductor memory, such as a ROM (Read Only Memory), a RAM (Random Access Memory) and the like, and a storage media, such as a magnetic disk, an optical disk and the like, and is configured to store digital image data converted by the image input 3.

The stereo processor 5 is provided with and defined by a SAD value (city block distance) calculation circuit, a minimum and maximum value detection circuit and a disparity quantity determination circuit, and is configured to identify corresponding pixels by correlating the base image Gb and the comparison image Gc, and numerically express information on a distance to the object as 3-dimensional image information (hereafter referred to as a "distance image") based on a disparity quantity (hereafter referred to as a "parallax X") which occurs according to the distance to the object.

Figure 9:
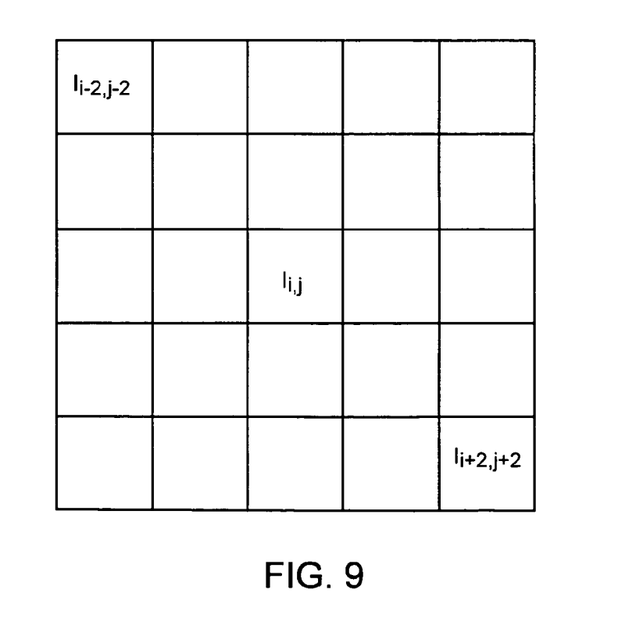
FIG. 9 is a block diagram showing a matching block of the image processing apparatus according to the present invention.

In the above city block distance calculation circuit, the matching processing is performed for two images, i.e., the base and comparison images Gb and Gc stored in the original image memory 4, for each horizontally 5×vertically 5 pixel area (hereafter referred to as a "matching block") of images Gb and Gc, respectively, as shown in FIG. 9, and the city block distance C being a measure of coincidence between the base and comparison images Gb and Gc is calculated as a value of SAD being an evaluation function. The minimum and maximum value detection circuit detects a minimum value Cmin, a maximum value Cmax and a mean value Cave of the calculated city block distance C, and the subsequent disparity quantity determination circuit validates whether or not the obtained minimum value Cmin indicates a coincidence between the base and comparison images Gb and Gc to determine the parallax X.

Figure 10:
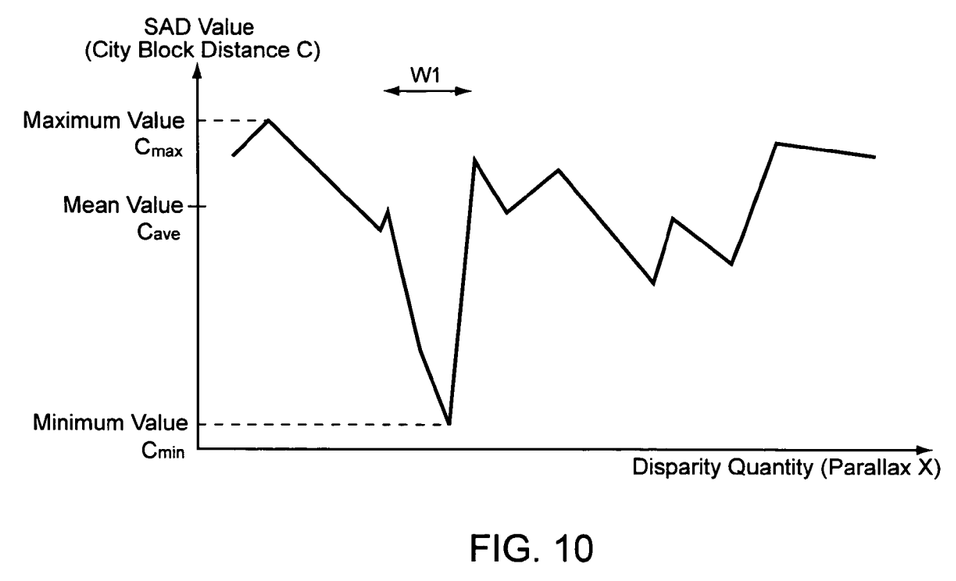
FIG. 10 is a graph showing a matching processing result by the image processing apparatus according to the present invention.

As shown in Equation (2) below, the SAD means Sum of Absolute Difference between brightness values $Ib_{i,j}$ and $Ic_{i,j}$ of corresponding pixels in the base and comparison images Gb and Gc, and as shown in FIG. 10, the SAD function is obtained on a 2-dimensional coordinate, whose vertical axis is the city block distance C calculated by the SAD and whose horizontal axis is the parallax X. The greater the degree of coincidence between the base and comparison images Gb and Gc (i.e., the reliability of the matching processing) is, the smaller the city block distance C becomes, and the lower the reliability is, the greater the city block distance C becomes.

$$C = \sum_{i,j} |Ib_{i,j} - Ic_{i,j}| \quad (2)$$

Here, $Ib_{i,j}$ and $Ic_{i,j}$ each indicates a brightness value of a horizontally i-th and vertically j-th pixel in the matching block of the base and comparison images Gb and Gc, respectively.

Additionally a validation in the disparity quantity determination circuit is performed to determine whether or not the maximum value Cmax or the minimum value Cmin of the city block distance C satisfies Cmax≦Ca and Cmax−Cmin≧Cb for preset thresholds Ca or Cb, respectively; and further, whether or not a brightness difference between horizontally adjacent pixels in the matching block of the base image Gb is greater than a preset threshold. If these three conditions are met, the parallax X is output and if not, the data is rejected.

The determinant factor extractor 12 is configured to extract feature quantities which are determination criteria in evaluating matching processing reliability. The extracted feature quantities are broadly categorized into 3 factors: analysis results of the evaluation function SAD, the factor indicating the uniqueness of the matching block, and the factor indicating the relevance with the surrounding matching blocks, each of which will be described in detail below.

First, the analysis results of SAD will be described.

The analysis results of SAD are divided into values of the city block distance C and a factor concerning the shape of the SAD function. The values of the city block distance C include the minimum value Cmin, the maximum value Cmax and the mean value Cave of the city block distance C, which are calculated by a SAD value city block distance calculation circuit in the stereo processor 5.

The factor concerning the shape of the SAD function may be the number of local minimum points, a width W1 of a valley containing a minimum point or an acute angle of the valley containing the minimum point.

When a city block distance of a horizontally i-th pixel in the matching block is Ci and the mean SAD function value is a threshold, the number of local minimum points means the number of points under the above threshold which satisfy conditions $C_{i-N} > C_{i-(N-1)} \ldots > C_i$ and $C_{i+N} > C_{i+(N-1)} \ldots > C_i$ for N points (fixed value with N>2) in the vicinity of a point i; that is, the number of valleys.

The width W1 of the valley containing the minimum point is n+m, wherein n is a minimum value which satisfies $k \times C_{i-n} > C_{i-n-1}$ in the leftward vicinity of the local minimum point, and m is a minimum value which satisfies $k \times C_{i+m} > C_{i+m+1}$ in the rightward vicinity of the local minimum point; and this W1 is greater for objects with a continuous tonal change, i.e., more moderate gradation slope, and smaller for objects with a steeper slope. Here, the above k is a constant and normally set to 1.

The acute angle of the valley containing the minimum point is calculated in the following 2 methods. In one method, a difference between a mean value of the city block distance C at both ends of the width of the valley containing the minimum point, and a value of the city block distance C at the minimum point is divided by the width of the valley W1 to allow detection of the acute angle of the entire valley. In the other is a method in which an average of differences between a value of the city block distance C at the minimum point and at each of two pixels adjacent to the minimum point, respectively, is calculated to allow detection of an acute angle in the vicinity. The more gradual or steep the gradation slope becomes, the smaller or greater these acute angles of the valley become, respectively.

$$A = \frac{S_{i+1} + S_{i-1} - 2S_i}{2} \quad (3)$$

Next, the factor indicating the uniqueness of the matching block will be described.

The factor indicating the uniqueness of the matching block may be the number of pixels with a predetermined or greater absolute difference value in a direction along the epipolar line E in the matching block, a mean absolute difference in the direction along the epipolar line E in the matching block or a variance of brightness values in the matching block.

The absolute difference value in a direction along the epipolar line E in the matching block $D_{i,j}$ is calculated with Equation (4) below, and the number of pixels in which the obtained absolute difference $D_{i,j}$ exceeds a predetermined is taken as a feature quantity.

$$D_{i,j} = |I_{i,j} - I_{i+1,j}| \qquad (4)$$

The absolute difference value in a direction along the epipolar line E in the matching block $D_{i,j}$ obtained in the above calculation method is further averaged out with Equation (5) below and a mean absolute difference value $D_{ave}$ in a direction along the epipolar line E in the matching block is taken as a feature quantity.

$$D_{ave} = \frac{1}{i \times j} \sum_{i,j} D_{i,j} \qquad (5)$$

Moreover, the above mean absolute difference value $D_{ave}$ in a direction along the epipolar line E in the matching block is utilized to yield the variance of brightness values V in the matching block as in Equation (6).

$$V = \frac{1}{i \times j} \sum_{i,j} (D_{i,j} - D_{ave})^2 \qquad (6)$$

Finally, the factor indicating the relevance with the surrounding matching blocks will be described.

This factor indicating the relevance with the surrounding matching blocks may be the number of blocks similar to a self-block in a self-matching processing, a mean value of a SAD function in the self-matching processing, values concerning the shape of the SAD function in the self-matching processing or the number of blocks around the self-block which output the same parallax.

For the number of blocks similar to the self-block in a self-matching processing, an arbitrarily chosen horizontally 5×vertically 5 matching block from the same image (hereafter referred to as a "self-block") is shifted block-by-block for scanning in the direction along the epipolar line E to correspond this self-block and the matching block on the epipolar line E and calculate a city block distance Cs. The number of blocks in which the city block distance Cs calculated as above is less than a predetermined value is the number of matching blocks similar to the self-block in the self-matching processing. The greater this number is, the lower a reliability for the matching block is; and the smaller this number is, the higher the reliability is.

Figure 11:
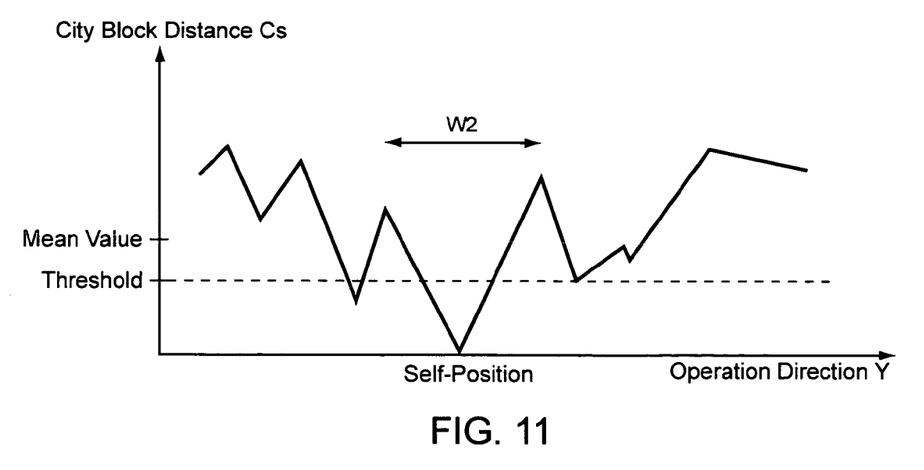
FIG. 11 is a graph showing a self-matching processing result by the image processing apparatus according to the present invention.

As shown in Equation (7) below, this city block distance Cs calculated by the self-matching processing is obtained by a summation of absolute differences between brightness of the self-block $S_{i,j}$ and brightness of the matching block on the epipolar line E, $S_{i+1,j}$. In addition, the SAD function is obtained in a 2-dimensional graph with the city block distance Cs calculated by the self-matching processing as the vertical axis and a scanning direction Y along the epipolar line E as the horizontal axis, as shown in FIG. 11.

$$Cs = \sum_{i,j} |S_{i,j} - S_{i+1,j}| \qquad (7)$$

Figure 12:
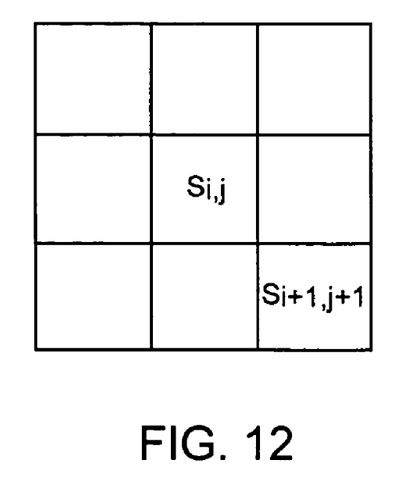
FIG. 12 is a plane view showing a self-block and its surrounding matching blocks of the image processing apparatus according to the present invention.

Here, $S_{i,j}$ indicates a brightness value of a vertically i-th and horizontally j-th matching block in the matching block area of horizontally 3×vertically 3 blocks, as shown in FIG. 12, and $S_{i+1,j}$ indicates a brightness value of a vertically (i+1)-th and horizontally (j+1)-th matching block.

A mean city block distance Cs of the self-matching processor is an average value of the city block distance Cs calculated by the self-matching processing. The smaller this value is, the lower the reliability often is for the matching processing; and the greater this value is, the higher the reliability often is.

The values concerning the shape of the SAD function in the self-matching processing include the number of local minimum points, a width W2 of a valley containing a minimum point or an acute angle of the valley containing the minimum point. Here, a smallest point of the SAD function in the self-matching processing is a position at which the self-block exists or so-called self-position, where the city block distance Cs becomes zero. A method for calculating these vales are the same as the method described above for calculating the values concerning the shape of the SAD function in a normal matching processing, and criteria for determining the matching processing reliability is also the same.

The number of blocks around the self-block which output the same parallax means the number of matching blocks, out of 8 matching blocks surrounding the self-block, which output the same parallax as that output by the self-block, wherein the self-block is a central matching block in the matching area shown in FIG. 12. The greater this number is, the higher the reliability is; and the smaller this number is, the lower the reliability is for the matching processing.

Figure 13:
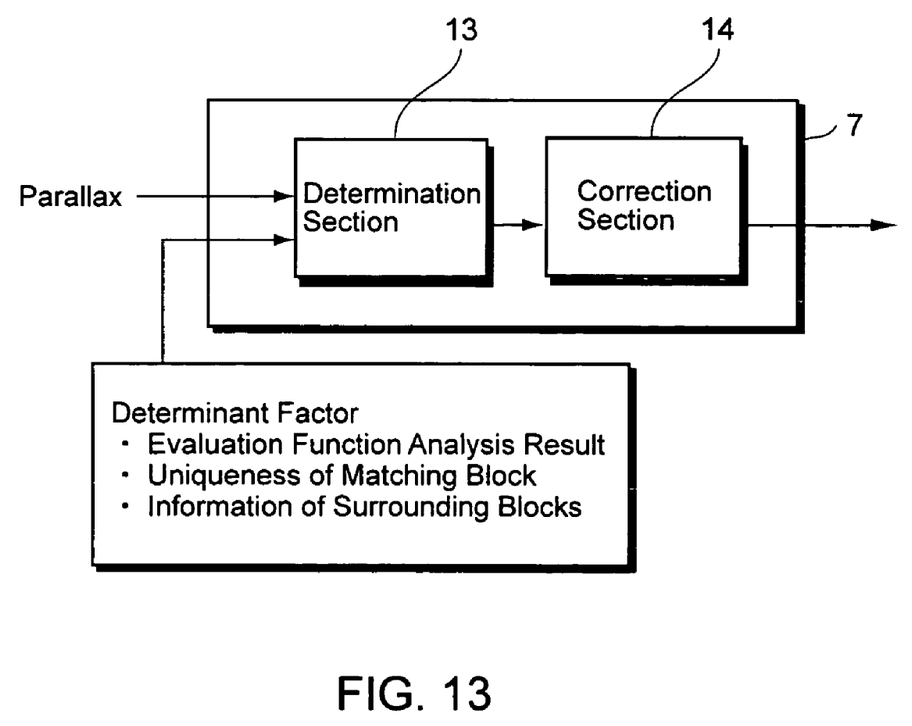
FIG. 13 is a block diagram showing a structure of a parallax corrector of the image processing apparatus according to the present invention.
Figure 14:
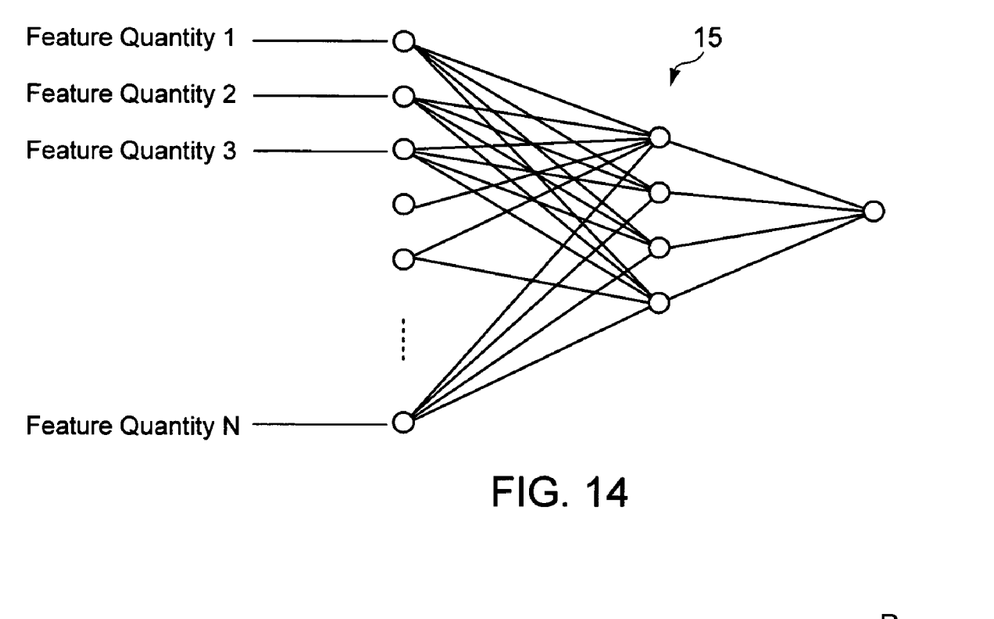
FIG. 14 is a schematic view showing a neural net applied to the image processing apparatus according to the present invention.
Figure 15:
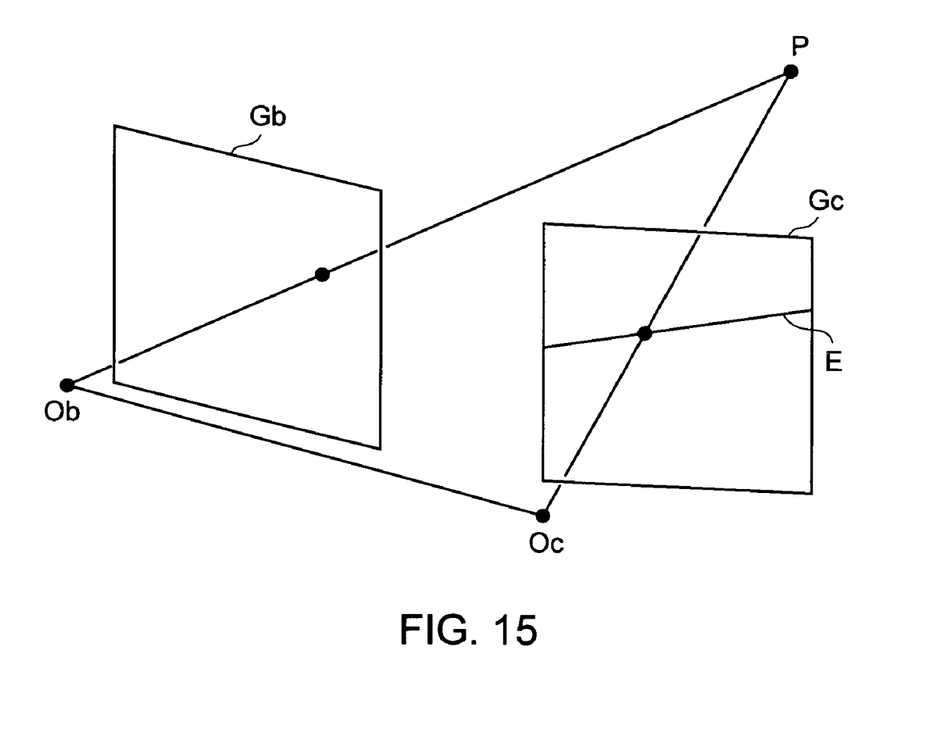
FIG. 15 is a conceptual diagram showing a principle of a stereo image technique using 2 cameras.

As shown in FIG. 13, the parallax corrector 6 is provided with and defined by a determination section 13 for detecting mismatch points and evaluating the reliability of the matching processing, and a correction section 14 for performing correcting processing based on evaluation information from the determination section 13. As shown in FIG. 14, the determination section 13 consists of a hierarchical neural net 15 with 3 nonlinear tiers, wherein mismatch points occurring during the matching processing are detected, and concomitantly the matching processing by the stereo processor 5 is evaluated with 3 reliabilities "high," "medium" and "low" based on the feature quantities sent from the minimum and maximum value detection circuit and the determinant factor extraction section 12 of the stereo processor 5. For example, if the evaluation is "low," correction processing is implemented by the subsequent processor 14 and an accurate distance image is sent to and stored in the subsequent distance image memory 8.

Next, operations of the image processing apparatus in the present embodiment will be described in the following.

By pressing an input switch (not shown) of the image processing apparatus 1, the two cameras 1 and 2 of the stereo cameras 10 take images of analog data, the base image Gb and the comparison image Gc, and send the images to the image input 3. The brightness balance of the base and comparison images Gb and Gc are adjusted by the analog interface in the image input 3, and a log conversion table subsequently performs image correction processing such as improving the contrast of low brightness sections in the images. In addition, the A/D converter converts the image data into digital data with a predetermined brightness scale, and the correction circuit subsequently performs the affine transformation and sends the data to store in the original image memory 4.

The city block distance calculation circuit in the stereo processor 5 scans the base and comparison images Gb and Gc stored in the original image memory 4 in the direction along the epipolar line E on the comparison image Gc one block at a time to thereby calculate the city block distance C between one pixel in the base image Gb and corresponding one pixel in the comparison image Gc. Further, the minimum and maximum value detection circuit detects the minimum value Cmin, the maximum value Cmax and the mean value Cave of the calculated city block distance C, and the subsequent disparity quantity determination circuit validates whether or not the minimum value Cmin indicates a coincidence between the base and comparison images Gb and Gc to determine this Cmin=X as the parallax X.

The parallax X determined as above, and the minimum value Cmin, the maximum value Cmax and the mean value Cave of the city block distance C detected by the minimum and maximum value detection circuit are sent to the parallax corrector 6. Simultaneously, the determinant factor extractor 12 extracts the values concerning the shape of the SAD function as feature quantities, the factor indicating the uniqueness of the matching block and the factor indicating the relevance with the surrounding matching blocks, and send them to the parallax corrector 6.

In the parallax corrector 6, a determination section 13 detects mismatch points based on these feature quantities and evaluates the reliability of the matching processing. Results of these mismatch point detection and reliability evaluation for the matching processing are sent to the subsequent correction section 14 to apply the correction processing to the distance image depending on the evaluation and store the corrected distance image in the distance image memory 8 as distance image corresponding to one pixel of the base image Gb. Moreover, distance images for the entire image are calculated and stored in the distance image memory 8 by repeating similar operations to thereby complete a series of image processing operations.

At this point, the mismatch point detection and reliability evaluation for the matching processing by the determination section 13 of the parallax corrector 6 are input into an identification device the hierarchical neural net 15 with nonlinear tiers as shown in FIG. 14 for identifying feature quantities such as the SAD results extracted by the minimum and maximum value detection circuit and the determinant factor extractor 12 of stereo processor 5, the uniqueness of the matching block and the relevance with the surrounding matching blocks with 2 values "correct" or "incorrect", or otherwise 3 values "correct", "incorrect" or "neither" to detect mismatch points based on the entered and determine the reliability of the matching processing with 3 grades "high", "medium" or "low." If the reliability is determined to be "high," the correction processing is not performed in the correction section 14, and if the reliability is low, the correction is applied. Meanwhile, if the reliability is "medium," the correction processing is performed based on information of, for example, "high" reliability matching block(s) around the self-block to calculate an accurate distance image for the entire image.

As has been described previously, according to the image processing apparatus of the present embodiment, provided with: the stereo cameras 10 having two cameras 1 and 2 for taking two images Gb and Gc; and the stereo processor 5 for performing the matching processing for the two images Gb and Gc taken by the stereo cameras 10, which image processing apparatus further provided with the parallax corrector provided with and defined by: the determinant factor extractor 12 for extracting a plurality of feature quantities from the two images Gb and Gc processed with matching processing; the determination section 13 for evaluating the reliability of the matching processing by the stereo processor 5 for the plurality of images Gb and Gc based on a plurality of feature quantities extracted; and the correction section 14 for correcting a mismatch which occurs during the matching processing based on the evaluation information from the determination section 13, effects the improvement of accuracies for the mismatch point detection and the reliability evaluation for the matching processing by the evaluation based on the plurality of feature quantities even when an evaluation with one feature quantity is impossible or ambiguous to further effect the improvement of measurement accuracies in subsequent correction processing performed based on the above detection result and reliability evaluation.

Incidentally, although all feature quantities are entered to the determination section 13 above, all of these feature quantities are not necessarily required and only required feature quantities may be entered depending on each application example.

Furthermore, a design and a learning process of the identification device are not limited to the present embodiment, and methods or techniques generally employed in the conventional pattern recognitions, for example, the K-nearest neighbor rule (k-NN), the support vector machine (SVM), the subspace method and the like may be applied.

Moreover, the determination section 13 should not be necessarily entirely defined by the neural net and may have it only partially.

Figure 16:
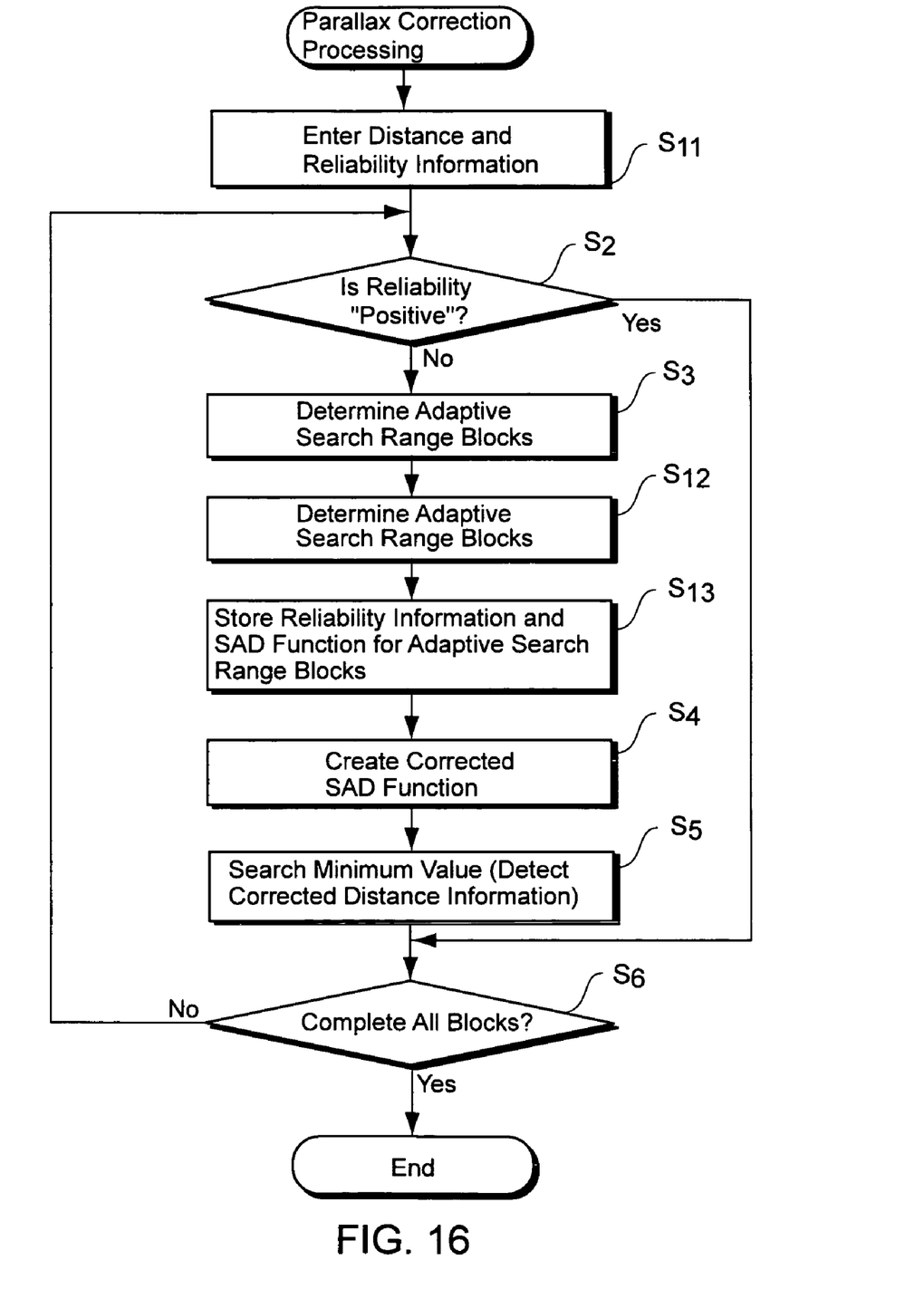
FIG. 16 is a flowchart showing an operation flow of stereo matching processing employed by a stereo image processing apparatus according to a second embodiment of the present invention.

FIG. 16 is a flowchart showing an operation flow of stereo matching processing employed by a stereo image processing apparatus according to a second embodiment of the present invention.

In the first embodiment, the parallax corrector 6 needs to maintain SAD function values from the stereo processor 5 for, for example, all blocks and requires an extremely large storage capacity. When it is impossible to reserve such a large-capacity memory, functions similar to those of the first embodiment may be effected by implementing the stereo matching processing a plurality of times in each block's matching processing.

This means that the present embodiment enables a correction of the distance information with a relatively small-capacity memory. To do this, the stereo processor 5 of the present embodiment performs the stereo matching processing twice. In a first stereo matching processing, the stereo processor 5 outputs only the distance and reliability information obtained for matching block in question to the parallax corrector 6.

If the reliability of the distance information for the matching block in question is relatively low, for example, "negative" or "moderately positive," the parallax corrector 6 sets a predetermined adaptive search range. In this case, the stereo processor 5 performs the stereo matching processing to each block within the adaptive search range. The stereo processor 5 then provides the parallax corrector 6 with the SAD function and the reliability information obtained for the adaptive search range block. The parallax corrector 6 applies weighting to the SAD function of blocks in the adaptive search range block according to the reliability and a distance to a block in question to thereby obtain a corrected SAD function.

Other configurations are the same as those of the first embodiment.

In an embodiment configured as above, the parallax corrector 6 obtains the distance and reliability information for the matching block in question from the stereo processor 5 in Step S11 of FIG. 16, and determines whether the reliability is "positive" or "negative" (Step S2). If the reliability is "positive," the stereo processor 5 performs the stereo matching processing for the next matching block in question.

If the reliability is "negative" or "moderately positive," the parallax corrector 6 determines the adaptive search range in Step S3. In Step S12, the stereo processor 5 implements the stereo matching processing for each adaptive search range block. The stereo processor 5 obtains and outputs to the parallax corrector 6, the reliability and the SAD function for each block. The parallax corrector 6 stores the reliability and SAD function obtained for the adaptive search range block (Step S13). The parallax corrector 6 applies the weighting to the SAD function of the adaptive search range block according to the reliability and distance in a similar manner to that of the first embodiment to obtain the corrected SAD function.

Note that the parallax corrector 6 may store the reliability and SAD function of all adaptive search range block as described above, and then calculate the corrected SAD function, and may accumulate the SAD function each time the reliability and SAD function of the adaptive search range block is entered to thereby obtain the corrected SAD function. In this case, a memory and its processing for storing results of the stereo matching processing for all search range blocks are not necessary.

Other configurations are the same as those of the first embodiment. Thus similar effects to those of the fist embodiment may be achieved in the present embodiment as well.

It should be mentioned that the present invention is not limited to the above embodiments, and that various changes and modifications can be made, without departing from the scope and spirit of the present invention.

For example, the stereo cameras 10 are not limited to the present embodiment and may consist of one camera for taking a plurality of images with a constant time interval and configured to detect a velocity vector indicating velocity components of each frame point in each image, or so-called optical flow.

What is claimed is:

1. A stereo image processing apparatus, comprising:
   an imaging device for taking a pair of images of an object for stereo image processing purposes;
   a stereo processor for correlating the pair of images for each area thereof to thereby perform stereo matching processing for identifying corresponding areas, and obtaining an evaluation function as a result of said stereo matching processing, distance information to said object obtained based on said evaluation function, and reliability information indicating a reliability of said distance information;
   a parallax corrector for setting an adaptive search range around said area according to said reliability information, obtaining a corrected evaluation function by correcting said evaluation function obtained for said area based on said evaluation function obtained for a respective area within said adaptive search range;
   wherein said parallax corrector sets said adaptive search range only if a reliability of said area meets predetermined conditions for being moderately positive or negative, and extends said adaptive search range in at least one direction around said area within a predetermined distance from said area to include at least one respective area having a positive reliability,
   and wherein said parallax corrector applies a weighting to said evaluation function obtained for said respective area within said adaptive search range according to said reliability information obtained for said respective area such that when said reliability is lower, the weighting is lower and when said reliability is higher, the weighting is higher, and also according to a distance between said respective area and said area, and then takes a summation of all of said evaluation functions within said adaptive search range as said corrected evaluation function for said area, in order to correct said distance information to said object based on said corrected evaluation function obtained.

2. The stereo image processing apparatus of claim 1, wherein said parallax corrector regards said corrected evaluation function as a summation of all of said evaluation functions, each of said evaluation functions obtained for said respective area.

3. The stereo image processing apparatus of claim 1, wherein said parallax corrector is provided with a storage for storing said evaluation functions, said distance information, and said reliability information obtained by said stereo processor for all of said areas, and
   obtains said corrected evaluation function based on said evaluation functions, said distance information, and said reliability information read from said storage.

4. The stereo image processing apparatus of claim 1, wherein said parallax corrector sets said adaptive search range based on said reliability information obtained by said stereo processor, wherein
   said stereo processor obtains said evaluation functions, said distance information, and said reliability information for said respective areas set within said adaptive search range, wherein
   said parallax corrector calculates said corrected evaluation function based on said evaluation functions each for said respective area within said adaptive search range, said evaluation functions obtained by said stereo processor.

5. The stereo image processing apparatus of claim 1, wherein:
   said stereo processor comprises a determinant factor extractor for extracting one or more feature quantities from a plurality of images with matching processing performed, and
   said parallax corrector is provided with a determination section for evaluating a reliability of said matching processing based on said feature quantities extracted, and a correction section for correcting a mismatch, said mismatch occurring during said matching processing based on evaluation information from said determination section.

6. The stereo image processing apparatus of claim 5, wherein:
   said determination section is configured using a neural net for performing a reliability evaluation of said matching processing for a plurality of images by said stereo processor.

7. The stereo image processing apparatus of claim 5, wherein:
   said feature quantities includes at least one of: an analysis result of said evaluation function used for said matching processing, a factor indicating uniqueness of a pixel area, or a factor indicating relevance with surrounding pixel areas.

8. The stereo image processing apparatus of claim 7, wherein:
   said analysis result of said evaluation function used for said matching processing includes at least one of: a value of said evaluation function and a factor indicating a shape of said evaluation function.

9. The stereo image processing apparatus of claim 8, wherein:

said factor indicating a shape of said evaluation function includes at least one of: the number of local minimum points, a width of a valley containing a minimum point and an acute angle of said valley containing said minimum point.

10. The stereo image processing apparatus of claim 7, wherein:

said factor indicating said uniqueness of a pixel area includes at least one of: the number of pixels in a pixel area, in said pixels an absolute value of a difference in a direction along an epipolar line exceeds a predetermined value, a mean absolute difference in a direction along an epipolar line, and a variance of brightness values in a pixel area.

11. The stereo image processing apparatus of claim 7, wherein:

said factor indicating said relevance with surrounding pixel areas includes at least one of: the number of pixel areas in which a value of said evaluation function in self-matching processing is less than a predetermined value, the number of local minimum points, a width of a valley containing a minimum point, an acute angle of said valley containing said minimum point, and the number of pixel areas which output an identical parallax in the vicinity of one pixel area arbitrarily selected.

* * * * *